(12) United States Patent
Ostrovsky Pressler et al.

(10) Patent No.: US 11,787,514 B2
(45) Date of Patent: Oct. 17, 2023

(54) MARINE CONSTRUCTION AND A METHOD FOR CONSTRUCTING THE SAME

(71) Applicant: ISRAEL PORTS DEVELOPMENT & ASSETS COMPANY LTD., Tel Aviv (IL)

(72) Inventors: Daniela Ostrovsky Pressler, Tel Aviv (IL); Dan Dicastro, Haifa (IL); Noa Oren, Tel Aviv (IL)

(73) Assignee: ISRAEL PORTS DEVELOPMENT & ASSETS COMPANY LTD., Tel Aviv (IL)

( * ) Notice: Subject to any disclaimer, the term of this patent is extended or adjusted under 35 U.S.C. 154(b) by 33 days.

(21) Appl. No.: 17/635,779

(22) PCT Filed: Aug. 27, 2020

(86) PCT No.: PCT/IL2020/050935
§ 371 (c)(1),
(2) Date: Feb. 16, 2022

(87) PCT Pub. No.: WO2021/038567
PCT Pub. Date: Mar. 4, 2021

(65) Prior Publication Data
US 2022/0324540 A1    Oct. 13, 2022

(30) Foreign Application Priority Data
Aug. 26, 2019   (IL) .......................................... 268914

(51) Int. Cl.
B63B 35/44    (2006.01)
B63B 35/00    (2020.01)
B63B 21/20    (2006.01)
B63B 21/26    (2006.01)
(Continued)

(52) U.S. Cl.
CPC ................ B63B 35/00 (2013.01); B63B 5/14 (2013.01); B63B 21/20 (2013.01); B63B 21/26 (2013.01);
(Continued)

(58) Field of Classification Search
CPC ........... B63B 5/14; B63B 21/20; B63B 21/26; B63B 35/00; B63B 39/03;
(Continued)

(56) References Cited

U.S. PATENT DOCUMENTS 4,007,598 A     2/1977   Tax
4,067,285 A *   1/1978   Jones ..................... B63B 35/38
                                                        114/267
(Continued)

FOREIGN PATENT DOCUMENTS

CN    109110057 A  *  1/2019  ............. B63B 21/50
CN    110239684 A  *  9/2019  ............. B63B 21/50
(Continued)

OTHER PUBLICATIONS

International search report for PCT/IL2020/050935 dated Dec. 7, 2020.
(Continued)

*Primary Examiner* — Frederick L Lagman
(74) *Attorney, Agent, or Firm* — The Roy Gross Law Firm, LLC; Roy Gross

(57) ABSTRACT

The present invention provides for a method of marine construction. Said marine construction is based on an external perimeter and inner area and comprises seabed lying elements and floating elements. The marine construction of the present invention comprising fixed elements that are placed on the defined perimeter of said marine construction. Said fixed elements are lying on the seabed. And further comprising floating elements that are placed in the inner area
(Continued)

the marine construction, defined by said external perimeter. The marine construction is capable of being deployed at a variety of distances from shore, at a differential nature of sea bed, and to be able to carry out different tasks and destinations, such as but not limited to airport, residency, army base, power station, port, marina, other infrastructures, etc. and any combination thereof.

14 Claims, 3 Drawing Sheets

(51) Int. Cl.
- *B63B 5/14* (2006.01)
- *B63B 39/03* (2006.01)
- *E02B 3/06* (2006.01)
- *E02B 17/00* (2006.01)

(52) U.S. Cl.
CPC .............. *B63B 35/44* (2013.01); *B63B 39/03* (2013.01); *B63B 2021/203* (2013.01); *E02B 3/06* (2013.01); *E02B 17/00* (2013.01)

(58) Field of Classification Search
CPC ...... B63B 2021/203; B63B 2035/4426; B63B 2035/4473; B63B 35/44; E02B 3/06; E02B 3/062; E02B 3/064; E02B 17/00
USPC .................................. 114/264, 266
See application file for complete search history.

(56) References Cited

U.S. PATENT DOCUMENTS

| | | | |
|---|---|---|---|
| 4,155,323 A * | 5/1979 | Finsterwalder | B63B 39/00 114/264 |
| 4,397,587 A | 8/1983 | Op den Velde et al. | |
| 5,421,282 A | 6/1995 | Morris | |
| 5,524,549 A * | 6/1996 | Morris | B63B 35/44 114/267 |
| 7,575,397 B2 * | 8/2009 | Sharapov | B63B 35/44 114/264 |
| 7,603,959 B1 * | 10/2009 | Veazey | E02B 3/062 114/263 |
| 8,262,321 B1 * | 9/2012 | Saebi | E01D 15/14 405/195.1 |
| 9,505,469 B2 * | 11/2016 | Valtanen | B65D 88/54 |
| 2005/0274312 A1 * | 12/2005 | Sutter | B63B 35/44 114/264 |
| 2008/0115715 A1 | 5/2008 | Del Tosto et al. | |
| 2009/0217855 A1 | 9/2009 | Wang et al. | |
| 2010/0218712 A1 * | 9/2010 | Yan | B63B 3/14 14/27 |
| 2011/0030602 A1 * | 2/2011 | Kania | B63B 35/38 114/264 |

FOREIGN PATENT DOCUMENTS

| | | | | |
|---|---|---|---|---|
| GB | 2555080 | | 4/2018 | |
| JP | 05278677 A | * | 10/1993 | |
| JP | H11192996 | | 7/1999 | |
| WO | WO-2006001796 A1 | * | 1/2006 | ............ B63B 35/44 |
| WO | WO-2016055965 A1 | * | 4/2016 | ............ B63B 35/38 |

OTHER PUBLICATIONS

Written opinion for PCT/IL2020/050935 dated Dec. 7, 2020.
Preliminary Report on Patentability for International application No. PCT/IL2020/050935 completed Dec. 16, 2021, 16pp.

* cited by examiner

MARINE CONSTRUCTION AND A METHOD FOR CONSTRUCTING THE SAME

CROSS REFERENCE TO RELATED APPLICATIONS

This application is a National Phase of PCT Patent Application No. PCT/IL2020/050935 having International filing date of Aug. 27, 2020 which claims the benefit of priority of Israeli Patent Application No. 268914, filed Aug. 26, 2019 the contents of which are all incorporated herein by reference in their entirety.

FIELD OF THE INVENTION

The present invention relates to the construction of artificial surfaces, and more specifically for the construction of marine construction of artificial surfaces, and even more specifically for large scale in-water artificial surfaces.

BACKGROUND

As cities, countries and economies expand, the need for land is growing. For many decades, civilizations developed many techniques and methods for enlarging land-like surfaces, on the account of water bodies, especially by expanding into the sea.

Such marine construction includes artificial islands, peninsulas, docks wharves, quays and other port structures, as well as residency, agricultural, transportation and infrastructure plants.

Two basic conceptions are used in such expansion (peninsulas, islands etc.). One is based on floating surfaces and the other land reclamation based on filling marine areas with filling material. Each conception has its drawbacks as will be briefly mentioned hereinafter.

Marine artificial surfaces can also be built by the method of a large concrete platform to be erected at a high level above seawater with the aim to limit wave overtopping for operational purposes. The platform could be composed by beams and slabs and has to be supported by large diameter pipe piles driven into the sea bottom There are several land reclamation methods known in the art, which diverse by the type of fill material, foundation soil, the topography of the seabed, the availability of equipment, and suitable material for reclamation.

Reclamation may lead to a great loss of fill material due to waves and currents actions and winds. Therefore, sometimes reclamation is carried out within a protected area after a bound has been formed around the proposed reclamation area. In this way, losses caused by waves and current actions can be minimized. However, this type of reclamation requires an outlet for the overflow of water and fine material otherwise, mud can be trapped at or near the corner of the bound.

Land reclamation protected by different kinds of offshore breakwaters is the common way to create new land at sea by displacing water with massive sand fill material. The sand should be: a) available by dredging in the vicinity of the project site. b) suitable for a firm foundation from an engineering point of view and c) environmentally friendly. In countries where there is a scarcity of sand to be dredged from near borrow pit and/or where the amount of sand supply has a major negative impact on significant coastal erosion and to the environment, there is a need in the art for a different and more acceptable solution.

Some drawbacks of the land reclamation concept derive from the loose nature of the filling material, which could limit the possibilities of stable surfacing the constructed area, or the loading usages allowed thereof.

The main drawback is, of course, the lack of availability of filling materials, especially sand, and the ecologic effect applied both where filling material has been taken near the construction site itself.

There were numerous attempts to deal with those drawbacks but none of them is significant.

U.S. Pat. No. 4,397,587A describes An artificial island, constructed by depositing material such as sand, clay or the like on the building site on the bottom and by providing inhibiting means formed by branched, relatively spaced elements positioned on the building site, to reduce the rate of affluence of the material such as sand, clay or the like along the sea bottom.

As mentioned, there are also attempts to construct surfaces on water bodies by way of floating islands.

U.S. Pat. No. 5,421,282A An artificial floating island is disclosed. The island includes a floating structure formed from a plurality of hollow island modules. Each module may have a platform and sidewalls for trapping air and providing buoyancy for the floating structure. The modules also include a plurality of shorter strengthening ribs to provide additional strength and safety. Adjacent island modules may be connected by hinge mechanisms to form the floating artificial island. An air supply mechanism may be connected to the sides of adjacent island modules to replenish air inside the hollow U.S. Pat. No. 4,007,598A An artificial island including at least one modular, upright supporting column having a base portion normally standing on the ocean floor, a platform supported by the column or columns in an operative position above the water surface, one or more floats sufficiently buoyant when filled with air to hold the platform in its operative position, and guide cables guiding the floats between a position of engagement with the platform and a position adjacent the ocean floor is assembled by floating the platform, floats, and column modules on the water surface to a desired location, lowering the column into the water until its base portion engages the ocean floor, attaching the floats to the platform in fixed spatial relationship while the floats are at least partly flooded and submerged, raising the platform by expelling water from the floats by means of compressed air, fastening the raised platform to the column in the operative position, and releasing the floats. The column may be assembled at the selected site from the base portion and modular sections sequentially secured to the platform while the latter still floats on the water surface.

In the concept of floating or sea level surfaces, the same are subjected to both horizontal and vertical forces mainly caused by environmental loads such as waves, tides, winds and currents, loads due to storage, traffic, heavy equipment, water ballast and loads of thermal origin, construction phases, impacts, earthquake etc.

The main drawback of all said methods is that they can't provide a marine (in sea) surface that could be stable and balanced, allowing for large scale surface along with significant and versatile load, and without the need for enormous quantities of filling material.

It is to be said that the problem of obtaining filling material is getting more crucial and the amount needed for a reasonable outcome is enormous. For example, Construction of the Kansai Airport Islands in the vicinity of the Japanese shore was a medium complexity undertaking. Approximately 180 million cubic meters of reclamation fill material was used to construct the 1.9 square miles first Island and approximately 250 million cubic meters of reclamation fill material was used to construct the 2.1 Sq. Miles 2nd Island.

SUMMARY OF THE INVENTION

It is an object of the present invention to provide for a method of marine construction. Said marine construction is based on an external perimeter and inner area.

It is a further object of the present invention to provide for a method of marine construction that comprises seabed lying elements and floating elements.

It is yet another object of the present invention to provide for a marine construction that is capable of being deployed at a variety of distances from shore, at a differential nature of sea bed, and to be able to carry out different tasks and destinations, such as but not limited to: airport, residency, army base, power station, port, marina, other infrastructures etc. and any combination thereof.

The marine construction of the present invention comprising fixed elements that are placed on the defined perimeter of said marine construction. Said fixed elements are lying on the seabed.

The marine construction of the present invention is further comprising floating elements. Said floating elements are to be placed in the inner area of said marine construction, defined by said external perimeter.

A DETAILED DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practised.

FIG. 1 is a top view of a marine waterbody 10 and a land 22 with the related coastline 20 and a schematic artificial peninsula 32 and island 34 according to the present invention. The artificial peninsula and island have an outer perimeter 42/44 comprising fixed elements, and an inner area 62/64 comprising floating elements. The island has a passage 24 connected to the mainland 22 that could be of any nature (bridge, embankment, floating etc.)

FIG. 2 depicts a cross-section of a marine construction according to some embodiments of the present invention. The fixed element 420 is a caisson made breakwater founded on the seabed 26, and having a defending wall extension 424 on top of it. The fixed element 422 is a caisson founded on the seabed. The floating elements 62 are connected to each other by a locking system means comprising special joints 70, and the outer floating element having a fender 72 and coupled or placed in the vicinity of the outer area fixed elements. The fixed and floating elements' upper surface is further connected by a ramp 74, to allow a fluent movement of pedestrians or transport vehicles. Sea level indicated 12 and demonstrates that the floating element is partially above it. A mooring system secures the floating elements comprising suspended and lying on seafloor chains 80, sinkers 82 or anchors. In this embodiment, the construction load is cargo 90 but the usage of the surface varies and is not limited.

A DETAILED DESCRIPTION OF THE INVENTION

Figure 1:
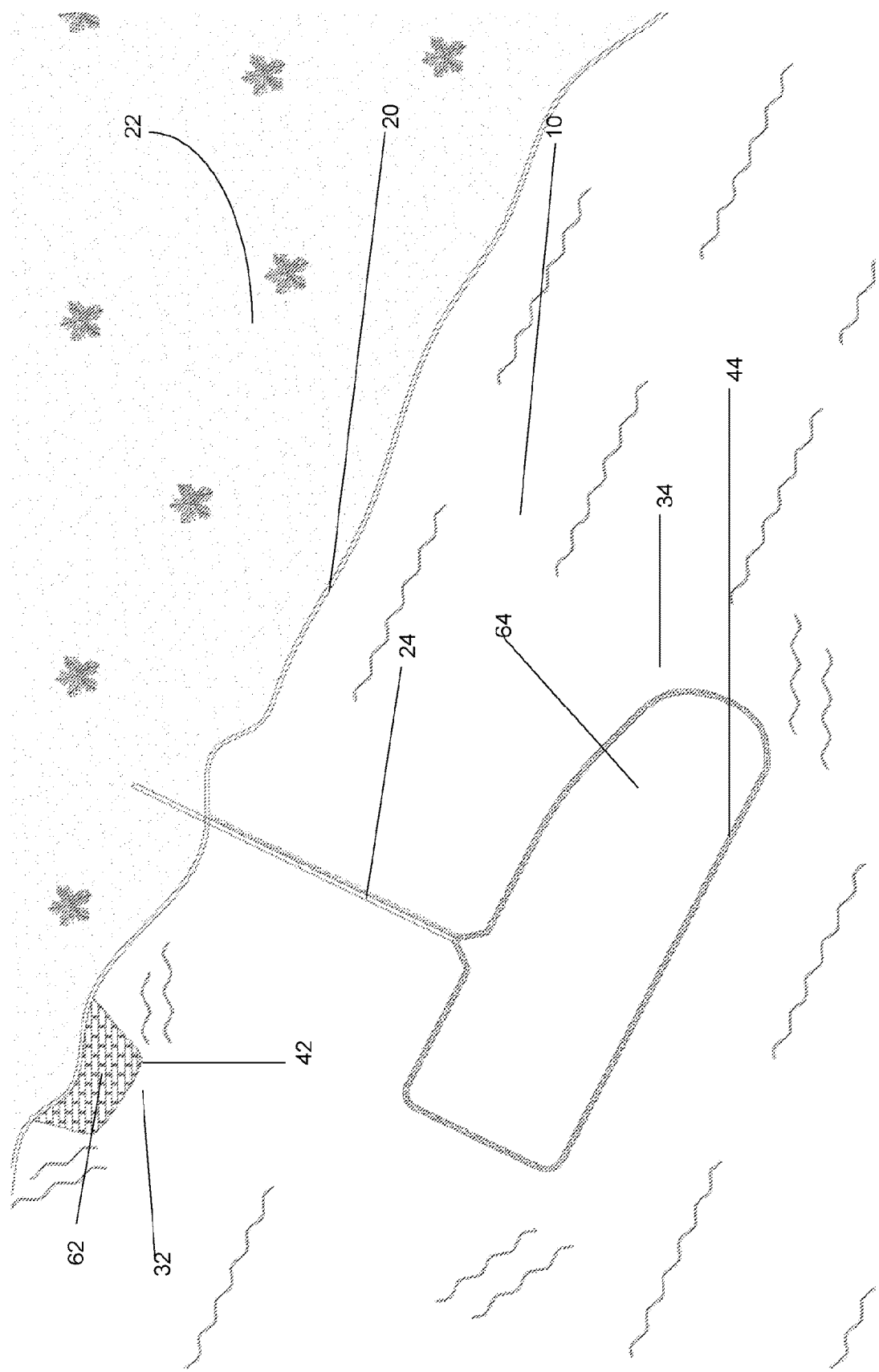
Figure 2:
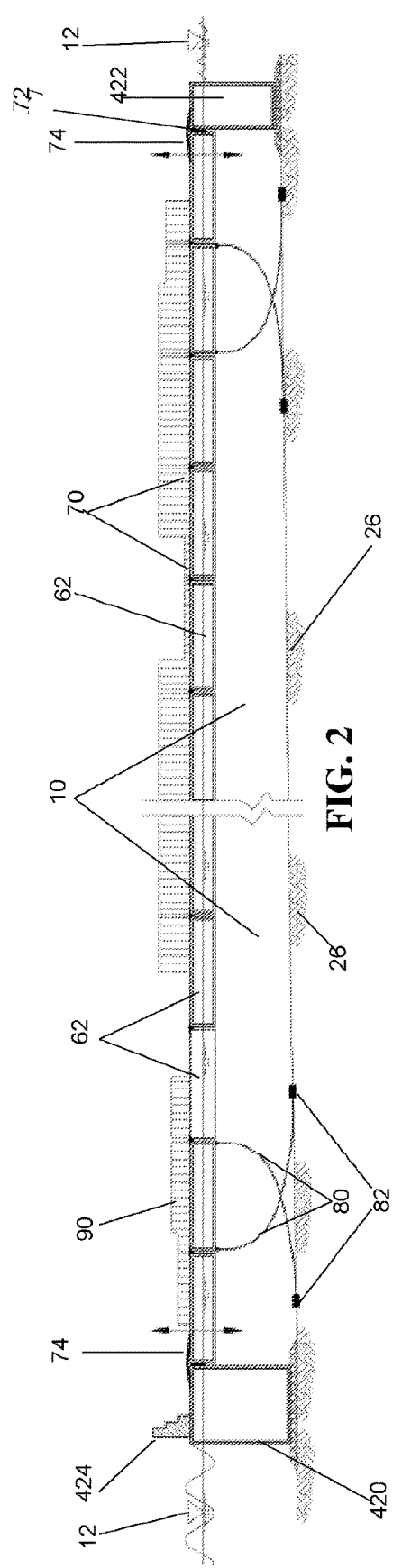
Figure 3:
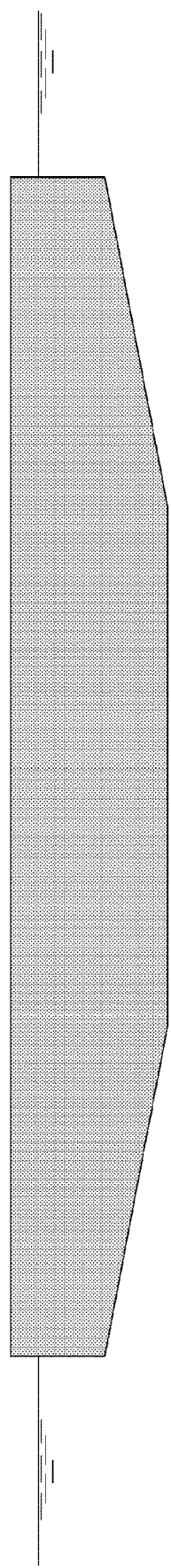
FIG. 3 is a longitudinal cross-section of a floating element 62 according to some embodiments of the present invention.
Figure 3A:
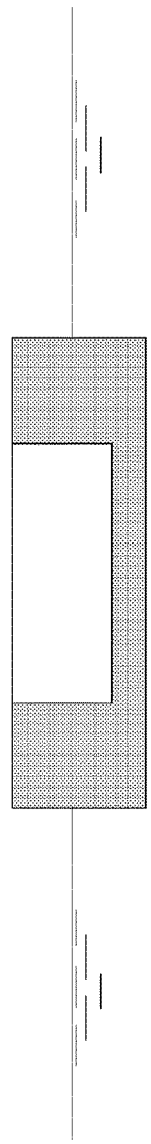
FIG. 3A is a transverse cross-section of the same. The Floating elements 62 of the present invention comprising inner cells, and could optionally use the inner space for infrastructures such as pipes, utility conduits or general services.
Figure 4:
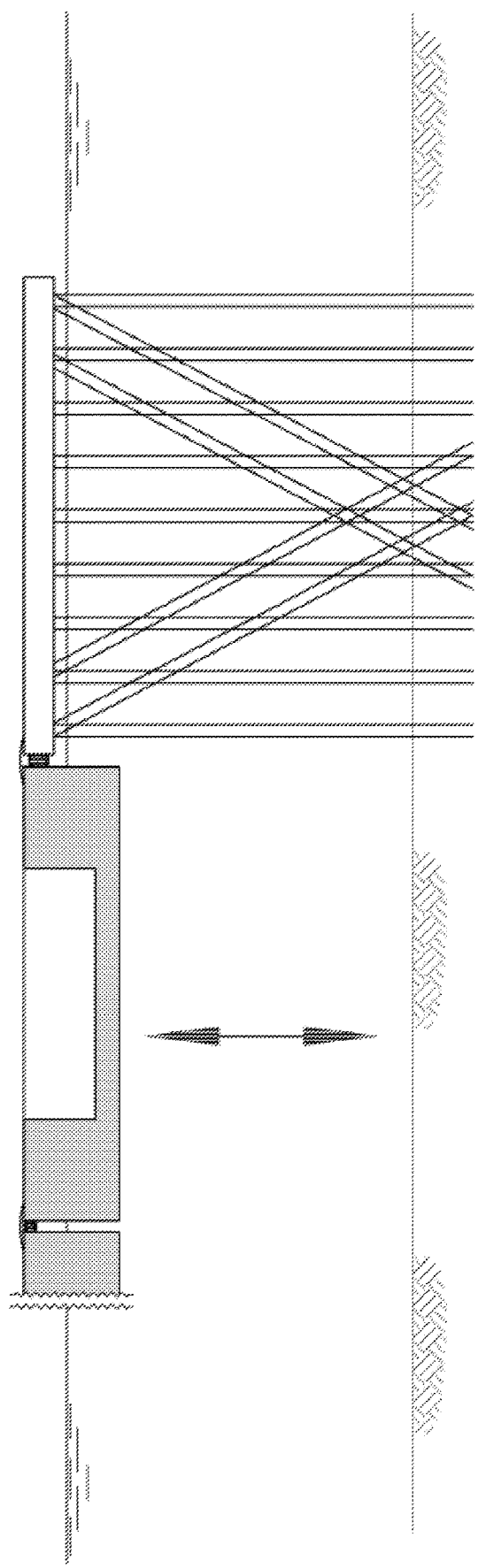
FIG. 4 depicts a cross-section of a floating element according to some embodiments of the present invention coupled and mounted to another floating element on one side and joined by means of a fender to a fixed piles-based platform on the other side.

It will be understood that prior art method of marine construction designed to obtain a land like surface in a previous seawater area is divided into two. The first one consists of filling while the other is based on floating elements.

The prior art methods consisting on filling, are often characterized with a type of outer fixed defining element, to provide strength and stability to the filling material area, while the methods consist of floating elements usually lack such elements.

The present invention novelty is the combination of external perimeter fixed and stable elements with an inner area floating element.

Said combination as discussed hereinafter, overcomes the drawbacks of all previous art methods and techniques.

The external perimeter of the marine construction of the present invention comprises a fixed element lying on the seabed and is located on the defined perimeter of the marine construction. Said fixed element could be a breakwater, a pile pipe construction, a caisson, a sheet pile wall or any other element characterized by resting on the bottom of the sea ocean or another water body, and is founded into a fixed position by suitable means.

It is understood to those skilled in the art that said fixing means is derived from the nature of the fixed element and could include, but not limited to, self-weight, driven foundations, or any combination of fixing means.

For a sheet pile wall or a piled construction, it will need driven elements. A breakwater is made of self-weight elements, and a caisson might be combined with various sizes of rocks or any other base.

It is important to note that said fixed elements are designed to be at least as high as the highest level of the water surface.

Said fixed elements could be made especially as part of the construction. or be used from existing fixed elements like an existing breakwater, a dock, an existing shoreline, terminal or any other combination of several different types of elements.

Said fixed element could be combined from several different types of elements. For example, a peninsula designed to be used as an extended cargo platform in a port and constructed to extend existing port surface. The construction could use the existing platform sidewall as a fixed element on one edge, an existing breakwater as another edge, a specially made caisson-based breakwater on yet another edge, and a sheet pile wall on additional edge.

In a preferred embodiment, said fixed element outer area, is forming a closed inner area protected from rapid and major water movement, yet in other embodiments, a gap is allowed between said fixed elements. Gaps could be spread with an order or occasionally as a result of numerousreasons such as constructing ease, tide, waves, currents, dimensions, cost calculation or any other.

In preferred embodiments of the present invention, the water break element is made of at least one caisson. Said at least one caisson could be placed on the seabed, preferably on top of a rock rubble-mound layer.

The inner area of the marine construction of the present invention is designed to be the main surface area thereof. The inner area comprising at least one floating element, designed to be located in between said fixed elements. Said at least one floating element is designed in any known matter. It will be understood to those skilled in the art that said at least one floating elements could be any large scale flat platform, such as for example from the knowledge used in the construction of large scale barges.

In a preferred embodiment of the present invention said at least one floating element comprises an upper surface, which is the surface to be used as land. It is further comprising a bottom surface and sidewalls to be mounted in between said upper and lower surfaces creating a space therein. Said sidewalls could be organized in different shapes and position in order to create at least one cell capacity, yet preferably several cells capacities, between said side walls and said upper and bottom surfaces. Said cells are used for obtaining buoyancy to said at least one floating element.

Said at least one floating element is to be constructed with consideration of the desired overall area of said marine construction, and the limitation derived from the place of construction of the element and the transition from said place to the actual construction area.

Said at least one floating elements should be equipped with a level and buoyancy control module. Said module could be designed by any suitable known method. In preferred embodiments of the present invention, the level and buoyancy module is designed to pump water to all or to selected cells formed between said upper and bottom surfaces of the floating element.

Said level balance and buoyancy control module could be operated independently for each floating element, or to be centralised and to operate for all or a selected group of floating elements. It will be understood to those skilled in the art that any suitable principle could be used for operating the level and buoyancy control module. Said module could be based on a mechanical detection and operation, on a digital sensing and computerised control or any combination allowed for maintaining a flat stable surface. Said module is designed to withstand all forces including load difference or water, winds and temperature implied forces.

It is preferred to construct said at least one floating element as large as possible, in order to minimize the need for on-site complex and a hard condition adjoining procedure.

In preferred embodiments of the present invention said at least one floating element is constructed from reinforced concrete, in other embodiments it could be constructed from steel or any other suitable material or composite materials. When required, the floating element should undergo an anti-corrosion protection.

It will be understood to those skilled in the art that construction of the floating elements shall be carried out with accordance to the environmental loads due to waves, tides, winds and currents, vertical loads due to storage, traffic, heavy equipment, water ballast and loads of thermal origin, construction phases, impacts, earthquake etc.

Said at least one floating elements are designed to be aligned next to each other, and to adjoining fixed elements.

Said at least one floating element could be coupled with each other or be mounted to each other, in any acceptable known technique known in the art for mounting floating platforms, docks barges or other floating surfaces. Such mounting could be done using shear keys and joints.

The said at least one inner area floating element is joined to the neighbouring fixed element of the outer area. Said join could be done in the same manner as between floating elements or by placing a fender in between the floating element and the fixed element.

In preferred embodiments of the present invention, the external perimeter and the inner area are covered with a top surface. Said surface could be asphalt, concrete or any other. In other embodiments, the upper surface of said marine construction could be an integral part of said floating and fixed elements. In order to maintain a continuous surface in between external perimeter and inner area of the construction, ramps, preferably from steel, could be mounted to the edge of one element and lay over the edge of a coupled element to create a continuous upper surface.

In preferred embodiments of the present invention, the floating element should be 8-15 meter height, while it is understood that said height is determined by the overall demands of the specific marine construction.

The external perimeter fixed elements of the present invention could be selected from any known elements, such as rock, concrete armour, caissons, sheet piles, piles or any combination thereof. The fixed elements should be founded on the seabed by self-weight, driven members, or any other way assuring they are not subject to movement by any of the forces applied in the marine environment, tides, waves, winds and the like.

In a preferred embodiment of the present invention, at least the edge proximal to the open sea (distant from the shoreline) is made of a full breakwater, in a manner that prevents water movement to affect the inner area underneath said floating elements.

In some embodiments of the present invention, the outer area said at least one fixed element is fully or partially based on an existing fixed element.

In some embodiment of the present invention, the fixed elements are spread throughout the perimeter of the marine construction creating a closed area while in other embodiments said perimeter is closed only partially with accordance to the requirements of the surroundings and the application of the said construction.

In some embodiments of the present invention, said at least one floating element is further moored to the seabed by means of cables or chains each coupled to a mooring member. Said mooring member could be sinker, anchor or driven element.

It will be understood for those skilled in the art that the embodiments described herein are just examples and are not bounding. The marine construction of the present invention and the method of construction include the placing of floating elements and fixed elements in different order and manner and of different types of elements pre-existed or newly placed.

The invention claimed is:

1. A marine construction comprising:
   an external perimeter, an inner area, a top surface, wherein
   said external perimeter is defined by at least one fixed element, and wherein
   said inner area comprising a plurality of floating elements, and wherein
   said at least one fixed element is permanently founded on the seabed bordering said external perimeter from all directions, and preventing horizontal movement of said plurality of floating elements by blocking the overall said external perimeter, and, and wherein said plurality of floating elements are partially submerged in the water, and wherein said plurality of floating elements has a level control module, and wherein said level control module is capable of controlling the buoyancy and balance of said plurality of floating elements.

2. A marine construction of claim 1, wherein said at least one fixed element is a concrete caisson, rocks, pipe piles or any combination thereof.

3. A marine construction of claim 1, wherein said plurality of floating elements are connected to each other by a locking system.

4. A marine construction of claim 1, wherein said plurality of floating elements is constructed from concrete, steel or any combination thereof.

5. A marine construction of claim 1, wherein said at least one fixed element, comprises a breakwater, a platform, a shoreline or other construction that existed prior to the construction of said marine construction.

6. A marine construction of claim 1, further comprising a mooring system, wherein said mooring system comprising chains or cables, and sinkers or anchors, and wherein said chains or cables are connected to at least one of said plurality of floating elements and to said sinkers or anchors, and wherein said sinkers or anchors are designed to be on the seabed.

7. A method for constructing a marine construction, the method comprising:

defining an external perimeter and an inner area, placing a plurality of floating elements in the inner area next to at least one fixed element that is placed on said defined external perimeter, and wherein said at least one fixed element is permanently founded on the seabed, and restricting the movement of said plurality of floating elements from all direction bounded by said external perimeter, and wherein said plurality of floating elements are partially submerged in the water, and wherein said plurality of floating elements has a level control module, and wherein said level control module is capable of controlling the buoyancy and balance of said plurality of floating elements.

8. A method for constructing a marine construction as in claim 7 wherein said at least one fixed element is a concrete caisson, rocks, pipe piles or any combination thereof.

9. A method for constructing a marine construction as in claim 7, wherein said plurality of floating elements are connected to each other by a locking system.

10. A method for constructing a marine construction as in claim 7, wherein said plurality of floating elements is constructed from concrete, steel or any combination thereof.

11. A method for constructing a marine construction as in claim 7, wherein said at least one fixed element, comprises a breakwater, a platform, a landline or other construction that existed prior to the construction of said marine construction.

12. A method for constructing a marine construction as in claim 7, further comprising:

attaching a mooring system to at least one of said plurality of floating elements, wherein said mooring system comprising chains or cables, and sinkers or anchors, and wherein said chains or cables are connected to at least one of said plurality of floating elements and to said sinkers or anchors, and wherein said sinkers or anchors are designed to be on the seabed.

13. A method for constructing a marine construction as in claim 7 wherein said at least one fixed element is pre-existed, newly placed or any combination thereof.

14. A method for constructing a marine construction as in claim 7, wherein said plurality of floating elements are placed before or after placing said at least one fixed element, or a combination thereof.

\* \* \* \* \*